US009501762B2

(12) United States Patent
Babenko et al.

(10) Patent No.: US 9,501,762 B2
(45) Date of Patent: Nov. 22, 2016

(54) APPLICATION RECOMMENDATION USING AUTOMATICALLY SYNCHRONIZED SHARED FOLDERS

(71) Applicant: Dropbox, Inc., San Francisco, CA (US)

(72) Inventors: Boris Babenko, San Mateo, CA (US); Emil Ibrishimov, Redwood City, CA (US)

(73) Assignee: Dropbox, Inc., San Francisco, CA (US)

( * ) Notice: Subject to any disclaimer, the term of this patent is extended or adjusted under 35 U.S.C. 154(b) by 407 days.

(21) Appl. No.: 13/868,558

(22) Filed: Apr. 23, 2013

(65) Prior Publication Data

US 2014/0317031 A1    Oct. 23, 2014

(51) Int. Cl.
  G06F 17/00   (2006.01)
  G06Q 10/10   (2012.01)
  G06F 17/30   (2006.01)
  G06Q 30/06   (2012.01)
  G06Q 50/00   (2012.01)

(52) U.S. Cl.
  CPC ....... *G06Q 10/101* (2013.01); *G06F 17/30017* (2013.01); *G06Q 30/0631* (2013.01); *G06Q 50/01* (2013.01)

(58) Field of Classification Search
  CPC ............... G06Q 30/0631; G06Q 50/01; G06F 17/30867
  USPC ............................................... 706/12, 45, 62
  See application file for complete search history.

(56) References Cited

U.S. PATENT DOCUMENTS

| 8,041,672 | B2 | 10/2011 | Ogawa et al. |
| 8,200,661 | B1* | 6/2012 | Pearce et al. ................. 707/721 |
| 8,468,164 | B1* | 6/2013 | Paleja et al. .................. 707/767 |
| 9,077,850 | B1* | 7/2015 | Groves .................... H04N 7/15 |
| 2003/0018917 | A1 | 1/2003 | Brown, Sr. |
| 2004/0019497 | A1 | 1/2004 | Volk et al. |
| 2005/0203907 | A1 | 9/2005 | Deshmukh et al. |
| 2006/0059174 | A1 | 3/2006 | Mese et al. |
| 2008/0154959 | A1* | 6/2008 | Dunko ................. B23K 26/146 |
| 2010/0017426 | A1 | 1/2010 | Marston |

(Continued)

OTHER PUBLICATIONS

U.S. Office Action dated Oct. 24, 2014, issued in related U.S. Appl. No. 14/078,399.

(Continued)

Primary Examiner — David Vincent
(74) Attorney, Agent, or Firm — Polsinelli LLP

(57) ABSTRACT

Various embodiments of the disclosed technology can obtain information about associations between users (e.g., user accounts) of a content management system and applications compatible with the content management system. Various embodiments can also obtain information about a plurality of attributes associated with usage of the content management system by the users (e.g., user accounts). In some embodiments, the attributes can include a device property, a usage pattern, an account property, a content item property, a profile property, a preference property, or a domain property. Moreover, data about social connections of the users (e.g., user accounts) can also be obtained. Based, at least in part, on at least one of the information about the associations, the information about the plurality of attributes, or the data about the social connections, one or more applications can be recommended to a selected user (e.g., a selected user account).

20 Claims, 12 Drawing Sheets

(56) References Cited

U.S. PATENT DOCUMENTS

| | | |
|---|---|---|
| 2010/0070707 A1 | 3/2010 | Nishimura |
| 2010/0161441 A1 | 6/2010 | Hounsell |
| 2010/0211575 A1 | 8/2010 | Collins et al. |
| 2010/0250337 A1 | 9/2010 | Kassaei |
| 2011/0238608 A1* | 9/2011 | Sathish ................. 706/47 |
| 2012/0290434 A1* | 11/2012 | Moritz et al. ............. 705/26.7 |
| 2012/0303477 A1 | 11/2012 | Ben-Itzhak |
| 2013/0132896 A1 | 5/2013 | Lee et al. |
| 2013/0138674 A1 | 5/2013 | Jeong et al. |
| 2013/0173637 A1 | 7/2013 | Kim et al. |
| 2013/0185292 A1 | 7/2013 | Li et al. |
| 2013/0215116 A1* | 8/2013 | Siddique ........... G06Q 30/0643 345/420 |
| 2014/0108617 A1 | 4/2014 | Gerstner |
| 2014/0180760 A1* | 6/2014 | Karatzoglou ............. 705/7.29 |

OTHER PUBLICATIONS

U.S. Office Action dated Apr. 8, 2015, issued in related U.S. Appl. No. 14/078,399.
U.S. Notice of Allowance dated Jul. 1, 2015, issued in related U.S. Appl. No. 14/078,399.

* cited by examiner

APPLICATION RECOMMENDATION USING AUTOMATICALLY SYNCHRONIZED SHARED FOLDERS

TECHNICAL FIELD

The present technology pertains to suggesting content, and more specifically pertains to recommending applications compatible with a content management system.

BACKGROUND

Online content storage is becoming more popular. People frequently store, access, or otherwise interact with content stored at online content management systems. Documents, pictures, music, videos, and other types of files or data can be stored at online content management systems to be accessed by users of the content management systems. Similarly, applications are becoming more commonplace. People use applications on their computing devices every day, and applications are growing in number and in function.

In some cases, applications can be configured to be compatible or operable with an online content management system. For example, third party software developers can create applications to be used in conjunction with the online content management system. Some applications can enhance or add functionality to the online content management system. However, as the number of applications being created and developed for the online content management system is increasing, users of the online content management system may not think of, know of, or otherwise recognize applications that might be of interest to them.

Downloading applications that are of little or no interest to a particular user can be inefficient in terms of utilizing computing resources of the particular user's computing device. Applications that are of little or no interest to the particular user can also cause negative results for the applications' developers. Thus, applications that are of little or no interest to the particular user can reduce the overall experience associated with using applications.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for recommending applications compatible with a content management system. In some embodiments, the present disclosure can utilize a collaborative filtering approach and obtain (e.g., receive) information about associations between users (e.g., user accounts) of the content management system and applications (also referred to as Apps) compatible with the content management system. The information about the associations can be obtained by the content management system because developers of the applications must communicate with (and get permission from) the content management system in order to make applications that are compatible with the content management system. Analysis of the information about the associations between the users (e.g., user accounts) and the applications can lead to recognition of correlations among certain applications and/or users (e.g., user accounts).

In some cases, patterns between users and applications can be determined based on analysis of the information about the associations between the users (e.g., user accounts) and the applications. For example, if a sufficiently large quantity of users (e.g., user accounts), who are engaged with Apps A, B, and E, are also engaged with App F, then it can be determined that there is likely a pattern or correlation between Apps A, B, E, and F. In this example, the pattern/correlation can suggest that users who are engaged with Apps A, B, and E, also tend to be engaged with App F. In some embodiments, engaging with an application can refer to having installed the application, interacting with the application, and/or using the application.

In some cases, automatic predictions can be made based on the information about the associations. Continuing with the previous example, if a new user (e.g., new user account, not yet processed user account, etc.) engages with Apps A, B, and E, but not yet with App F, then App F can be recommended to the user.

It is important to note that the examples discussed herein are for illustrative purposes only. A person having ordinary skill in the art would recognize various other manners or approaches that can be utilized consistent with the scope of the present disclosure.

In some embodiments, the present disclosure can utilize a classifier approach and obtain information about a plurality of attributes (also known as "signals") related to usage of the content management system by the users. In one example, an attribute can indicate a type of a computing device used by each user (e.g., used with each user account) to interact with the content management system. Another example attribute can indicate an operating system running on the computing device used by each user. A further example attribute can indicate how many files are stored and/or shared by each user (e.g., each user account) via the content management system. Based on at least some of the plurality of attributes, the disclosed technology can attempt to identify correlations among the attributes, applications, and/or users (e.g., user accounts). For instance, various embodiments can observe that users, who use tablet devices running Operating System B (OS B) and who share large image files with other users, tend to be engaged with App D. As such, App D can be recommended to a user who uses the content management system with an OS B tablet device and who also shares large image files with other users.

Moreover, in some embodiments, a social connection approach can be utilized by the disclosed technology. Various embodiments can obtain data about social connections associated with each user (e.g., each user account). A user can be "socially connected" to another user if they have shared content (e.g., shared files, shared folders, shared data, etc.). The content management system can have access to the data about the social connections associated with the users (e.g., user accounts) of the content management system. Various embodiments of the present disclosure can take into consideration applications that are used by the user's social connections (e.g., other users with whom the user has shared content). Recommending applications to the user (e.g., user account) can be based, at least in part, on what applications the user's social connections have.

In some embodiments, the information about the associations, the information about the plurality of attributes, and/or the data about the social connections can be input into one or more machine learning algorithms to produce one or more models that can find or identify correlations between the associations, attributes, social connections, users, and/or applications. Recommendations for applications can then be based on the one or more models. For example, supervised learning can be utilized to generate the one or more models. The information about the associations, the information about the plurality of attributes, and/or the data about the social connections can be already labeled, classified, or known. In other words, the information and data can include various inputs as well as the appropriate outputs that should result from those inputs (e.g., if User J engages with App X and runs a OS A device, then he should likely be interested in App Y). Then, using a supervised learning algorithm, the models can be inferred from the information about the associations, the information about the plurality of attributes, and/or the data about the social connections. In other words, in this example, the supervised learning algorithm can analyze the various information and data to generate the models. It is further contemplated that a person having ordinary skill in the art would recognize various other manners or approaches that can be utilized consistent with the scope of the present disclosure.

In some embodiments, a first model can be generated based on the information about the associations, a second model can be generated based on the information about the plurality of attributes, and a third model can be generated based on the data about the social connections. Applications can then be recommended for a selected user based on the first, second, and/or third models (independently or in any combined manner). In some embodiments, the information about the associations, the information about the plurality of attributes, and the data about the social connections can be used in conjunction to produce a collective model for recommending applications to the selected user.

Various embodiments can also enable the enhancement or refinement of application recommendation. Application recommendation can be improved and/or refined over time to make better recommendations (e.g., to recommend more relevant applications). In some embodiments, the one or more models and/or the collective model can be trained in an iterative manner. For example, there can be new and/or additional data (e.g., new training data) that can be used to modify, rebuild, refine, and/or improve the models.

Various other functions and advantages are described and suggested below as may be provided in accordance with the various embodiments.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for application recommendation using files stored with a networked environment. The disclosed technology can obtain information about associations between users of a content management system and applications compatible with the content management system. The disclosed technology can also obtain information about a plurality of attributes associated with usage of the content management system by the users. In some embodiments, the attributes can include a device property, a usage pattern, an account property, a content property, a profile property, a preference property, or a domain property. Moreover, data about social connections of the users can also be obtained. Based, at least in part, on at least one of the information about the associations, the information about the plurality of attributes, or the data about the social connections, one or more applications can be recommended to a selected user.

Figure 1:
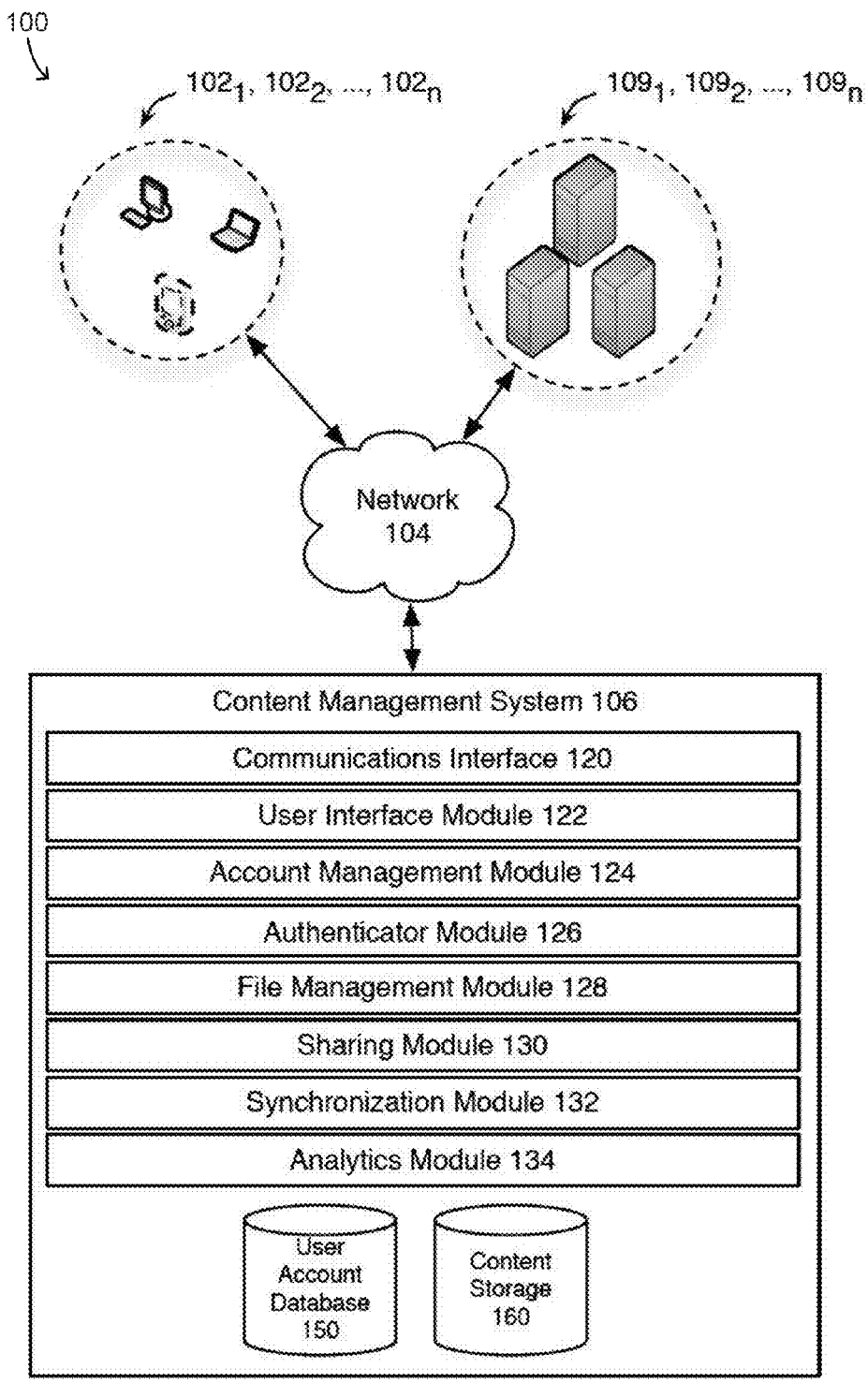
FIG. 1 shows an exemplary configuration of devices and a network in accordance with the invention.

An exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device 102, may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

Figure 2A:
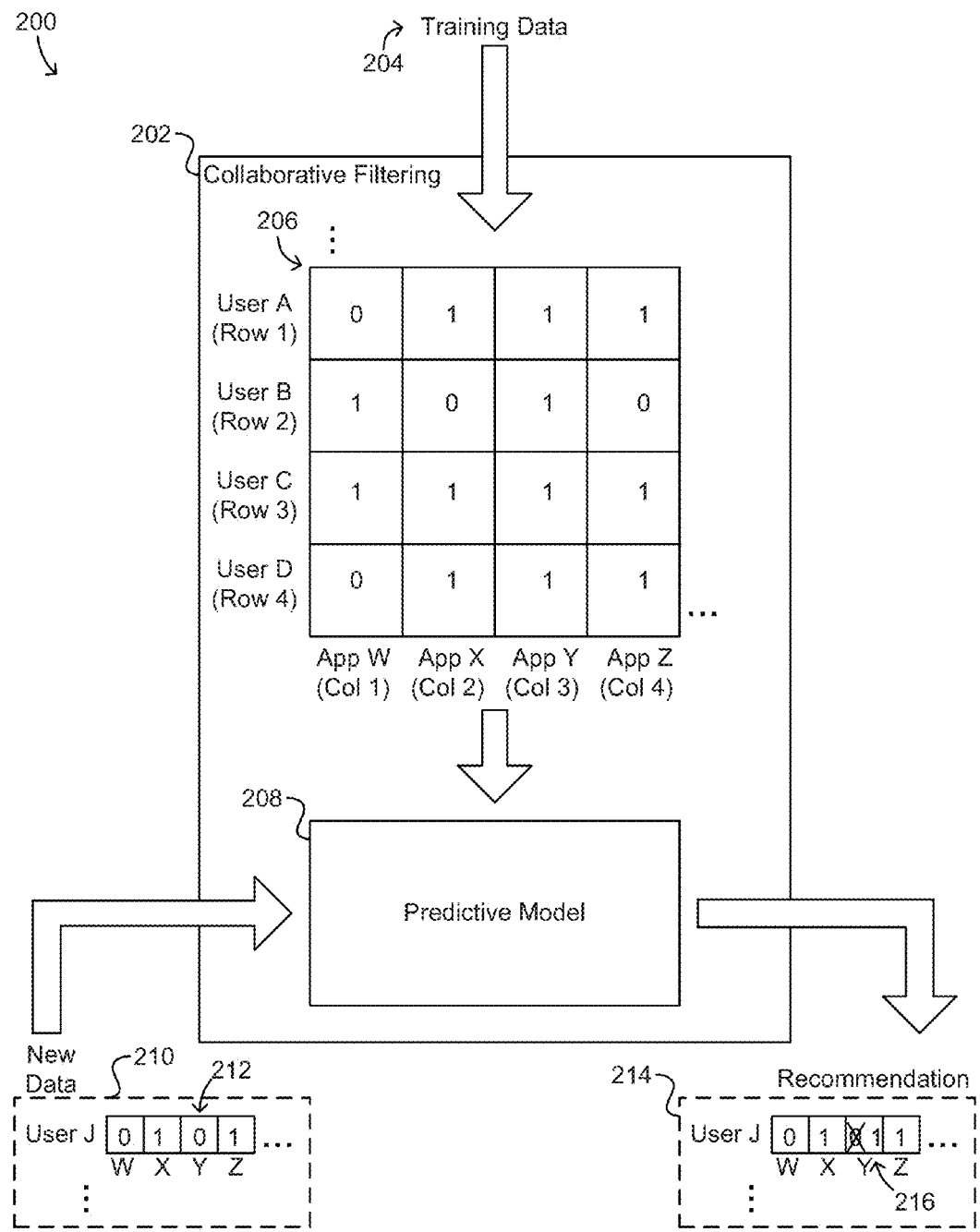
FIG. 2A shows an exemplary system embodiment for recommending applications compatible with a content management system.

With reference now to FIG. 2A, FIG. 2A shows an exemplary system embodiment for recommending applications compatible with a content management system (e.g., content management system 106 in FIG. 1). Exemplary system embodiment 200 can utilize collaborative filtering module 202 to determine recommendations for applications compatible or operable with the content management system. Collaborative filtering module 202 can obtain or receive training data 204 (i.e., test data, known data, preconfigured data, data that has already been classified, etc.). Training data 204 can include information about a plurality of users of the content management system (e.g., User A, User B, User C, User D, etc.), a plurality of applications compatible with the content management system (e.g., App W, App X, App Y, App Z, etc.), and the associations (or lack thereof) between the users and the applications. In some embodiments, matrix 206 can be generated based on training data 204 to hold information about the users, the applications, and the associations (or lack thereof). It is also contemplated that other suitable data structures can be utilized to hold, maintain, and/or present (at least a portion of) training data 204.

In one example, training data 204 can include information about which user of the content management system is associated with (e.g., has installed) which application(s). Each cell in matrix 206 can indicate whether or not a particular user is associated with (e.g., is engaged with, has installed) a particular application. In this example, User A has installed (e.g., has engaged with) App X, App Y, and App Z, but has not installed (e.g., has not engaged with) App W. This is because User A is represented by Row 1 in matrix 206 while App X, App Y, and App Z are represented by Column 2, Column 3, and Column 4, respectively. App W is represented by Column 1. The cell located at (Row 1, Column 2) or (1,2) in matrix 206 is a "1", which, in this example, indicates that User A has installed App X. Each of cells (1,3) and (1,4) also contains a "1", indicating that User A has installed App Y and App Z. Cell (1,1) is a "0", which means that User A has not installed App W.

Similarly, FIG. 2A shows that User B has installed Apps W and Y, but not Apps X and Z. User C has installed Apps W, X, Y, and Z. User D has installed Apps X, Y, and Z, but not App W.

Continuing with the example, based on training data 204 or the information stored at matrix 206, system 200 can generate predictive model 208. As discussed previously, in some cases, predictive model 208 can be generated using a machine learning algorithm, such as a supervised learning algorithm. Predictive model 208 can identify one or more correlations within training data 204 or the information stored at matrix 206. In this example, predictive model 208 can calculate, estimate, or predict that if a user has installed App X and App Z, then App Y should likely be of interest to the user. This is because, based on training data 204 or the information maintained by matrix 206, predictive model 208 can identify correlations between Apps X, Y, and Z. With respect to matrix 206, in every instance where a user (e.g., User A, User C, and User D) has installed App X and App Z, the user has also installed App Y. This and other correlations can be identified by predictive model 208, which can be utilized to analyze new or unknown data and provide application recommendations.

Continuing with the example, new data 210 (e.g., data to be analyzed, unknown data, unclassified data, etc.) can be received by exemplary system 200. New data 210 can include information about at least one user and one or more associations (or lack thereof) between the at least one user and the plurality of applications. In this example, new data 210 can correspond to User J. New data 210 can indicate that User J has installed Apps X and Z, but not Apps W and Y. Predictive model 208 can analyze new data 210, recognize that User J has installed Apps X and Z but not Y (212), and predict that User J should likely be interested in App Y. System 200 can then make a recommendation 214 to User J suggesting that User J might be interested in App Y 216.

Figure 2B:
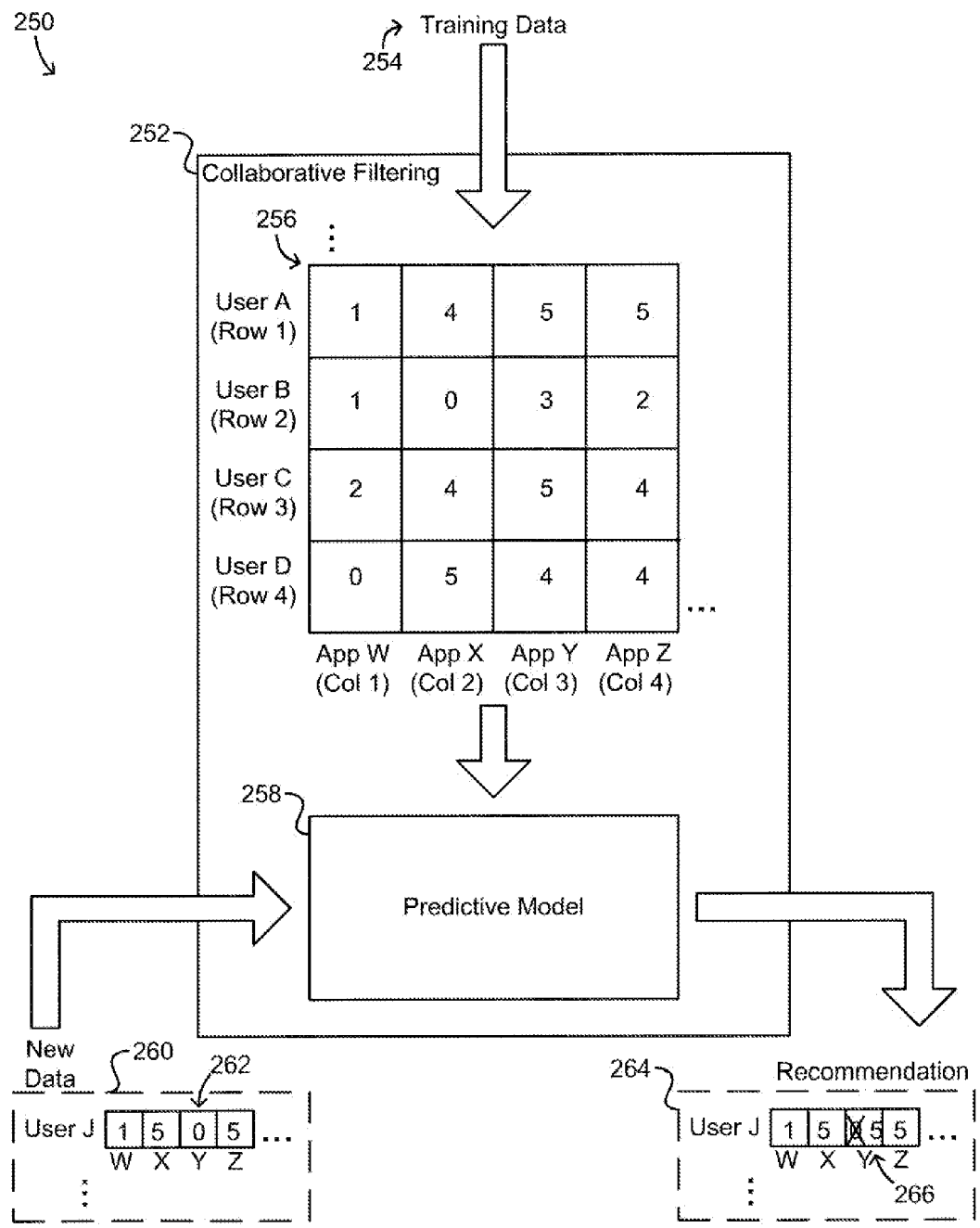
FIG. 2B shows an exemplary system embodiment for recommending applications compatible with a content management system.

In some embodiments, the associations (or lack thereof) between the plurality of users of the content management system and the plurality of applications operable with the content management system can indicate a level of engagement between each user and each application, as shown in the example of FIG. 2B.

FIG. 2B shows an exemplary system embodiment for recommending applications compatible with a content management system. In FIG. 2B, exemplary system embodiment 250 utilizes collaborative filtering unit 252. Collaborative filtering unit 252 can obtain or receive training data 254, which can include information about associations between a plurality of users of the content management system and a plurality of applications configured to work with the content management system. Collaborative filtering unit 252 can generate matrix 256 based on training data 254. Matrix 256 can provide the structure to hold the information about the associations between the users and the applications. In this example, each association can specify a level of engagement between a respective user and a respective application.

For example, as shown in FIG. 2B, there can be a value, on a scale of "0" to "5", contained in each cell of matrix 256. A cell containing a "0" value indicates that the cell's corresponding user has not installed the cell's corresponding application, whereas a "1" indicates that the user has installed but does not frequently interact with (e.g., engage in using, access, utilize, etc.) the application, while a "5" indicates that the user has installed and frequently interacts with the application, etc. Accordingly, in the example of FIG. 2B, User A has installed but rarely uses (if at all) App W, but frequently uses App X, and even more frequently uses Apps Y and Z. Likewise, User B has App W but rarely uses it, does not have App X, has App Y and occasionally uses it, and has App Z but uses it less than App Y. User C occasionally uses App W, frequently uses Apps X and Z, and most frequently uses App Y. User D frequently uses Apps Y and Z, most frequently uses App X, but does not have App W.

Based on training data 254 or the information in matrix 256, predictive model 258 can be generated and configured to determine any correlations between the users and the applications. In this example, predictive model 258 can determine (e.g., observe, estimate, predict, etc.) that users who frequently use Apps X and Z also frequently use App Y. As such, when new data 260 (e.g., data to be analyzed) is received by system 250, predictive model 258 can analyze new data 260 and recognize that User J has App W but rarely uses it, that User J uses Apps X and Z frequently, and that User J does not have App Y (262). As discussed above, predictive model 258 had previously identified correlations between Apps X, Y, and Z (e.g., predictive model 258 predicted that users who frequently use Apps X and Z would likely be interested in App Y). Accordingly, system 250 can make a recommendation 264 suggesting that User J might be very interested in App Y 266.

Figure 3A:
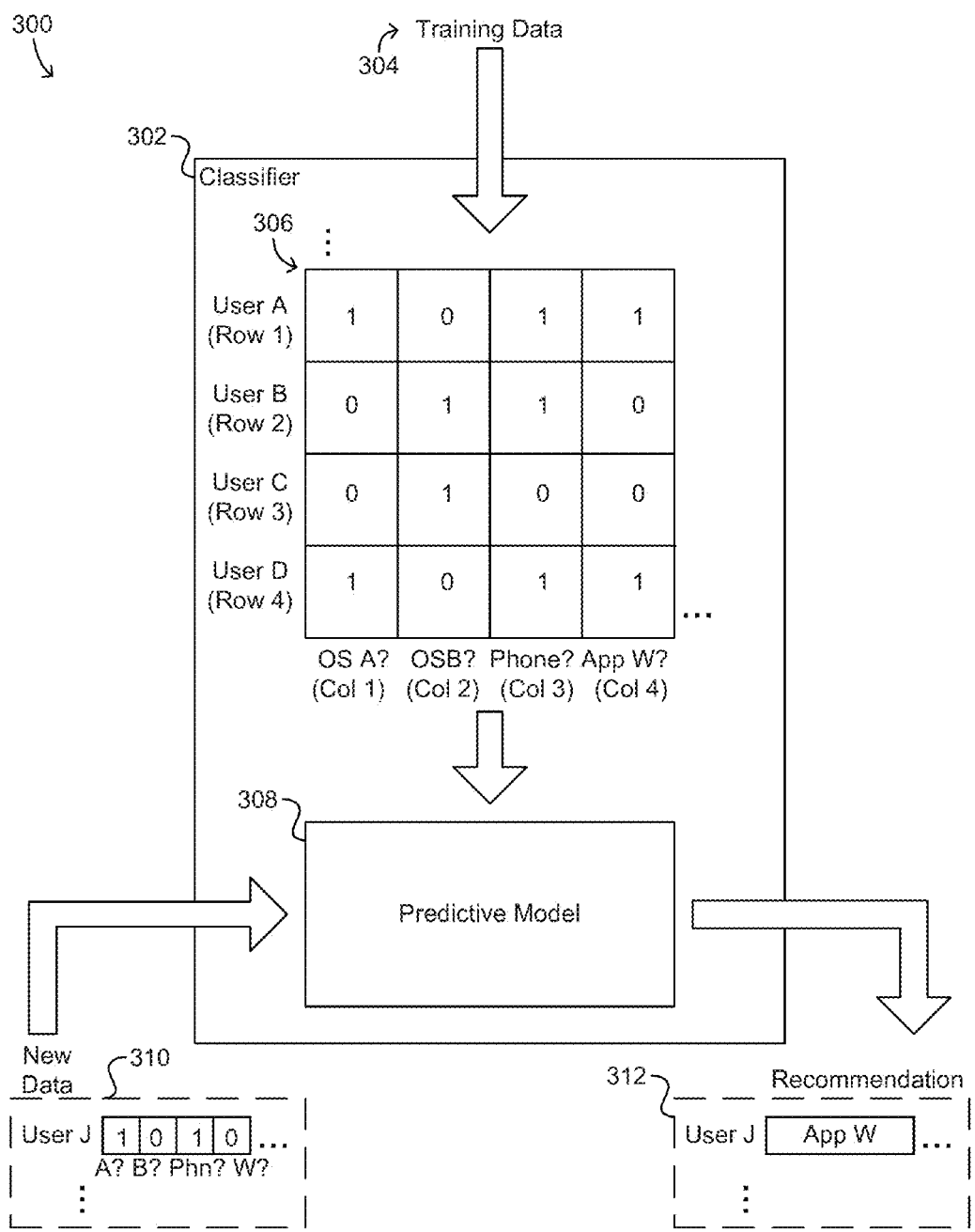
FIG. 3A shows an exemplary system embodiment for recommending applications compatible with a content management system.

FIG. 3A shows an exemplary system embodiment for recommending applications compatible with a content management system. In FIG. 3A, exemplary system embodiment 300 can include a classifier unit 302 configured to receive training data 304 (e.g., testing data, known data, etc.), generate matrix 306, and generate predictive model 308. As discussed above, in some cases, predictive model 308 can be generated using machine learning.

In some embodiments, training data 304 can include a plurality of attributes related to usage of the content management system by a plurality of users. The plurality of attributes can be organized, structured, and/or stored in matrix 306. The rows of matrix 306 can correspond to the users and the columns can correspond to the attributes. For example, as shown in FIG. 3A, Column 1 can correspond to an attribute for verifying whether users' devices used with the content management system run Operating System A.

In the example, cell (Row 1, Column 1) has a value of "1", which can mean that User A's device used with the content management system is running Operating System A. Similarly, matrix 206 shows that User B's and User C's devices used with the content management system are not running Operating System A, but Operating System B instead. User D's device is also running Operating System A and not Operating System B. Moreover, the devices of Users A, B, and D are phones, whereas User C's device is not a phone (e.g., perhaps a tablet, laptop, etc.). Furthermore, Users A and D have installed App W whereas Users B and C have not.

Continuing with the example, predictive model 308 can be generated based on training data 304 or the attributes related to usage of the content management system by the users. Predictive model 308 can recognize and incorporate correlations among the attributes, the users, and applications for the content management system. In this example, predictive model 308 can observe that users who use an Operating System A phone tend to have App W installed. Accordingly, when new data 310 is received, predictive model 308 can predict that App W should be recommended to User J because User J is using the content management system with a phone running Operating System A, but does not have App W installed yet.

In some embodiments, other example attributes (not shown in FIG. 3A) can include, but is not limited to, device attributes/information (e.g., device identification, device brand, device manufacturer, etc.), patterns associated with using the content management system (e.g., quantity and/or type of content items stored and/or shared by the users, etc.), account information for the users of the content management system (e.g., free account, paid account, team account, email domain, etc.), preferences of the users' accounts with the content management system (e.g., language, location, time, etc.), user profile information associated the users of the content management system (e.g., gender, age, etc.). For example, a device identification, such as a serial number, a unique string, a name, or another tag or code associated with each device, can enable the content management system and/or applications to identify a device and to distinguish between multiple devices. It is further contemplated that a person having ordinary skill in the art would recognize various other attributes or information that can be utilized or implemented with the various embodiments of the present disclosure.

To reiterate, the various attributes can be useful for providing indications of which applications for the content management system are likely to be useful and/or of interest to a user of the content management system. For example, the attributes might indicate that a particular user has an email domain "@designer.com", shares numerous large-size image files with other users having the "@designer.com" email domain, and has a paid account with the content management system. In this example, the attributes can suggest that the particular user is likely a designer and thus applications for design can be recommended to the particular user. Moreover, the attributes can indicate that this particular user might be interested in paid applications as well.

Figure 3B:
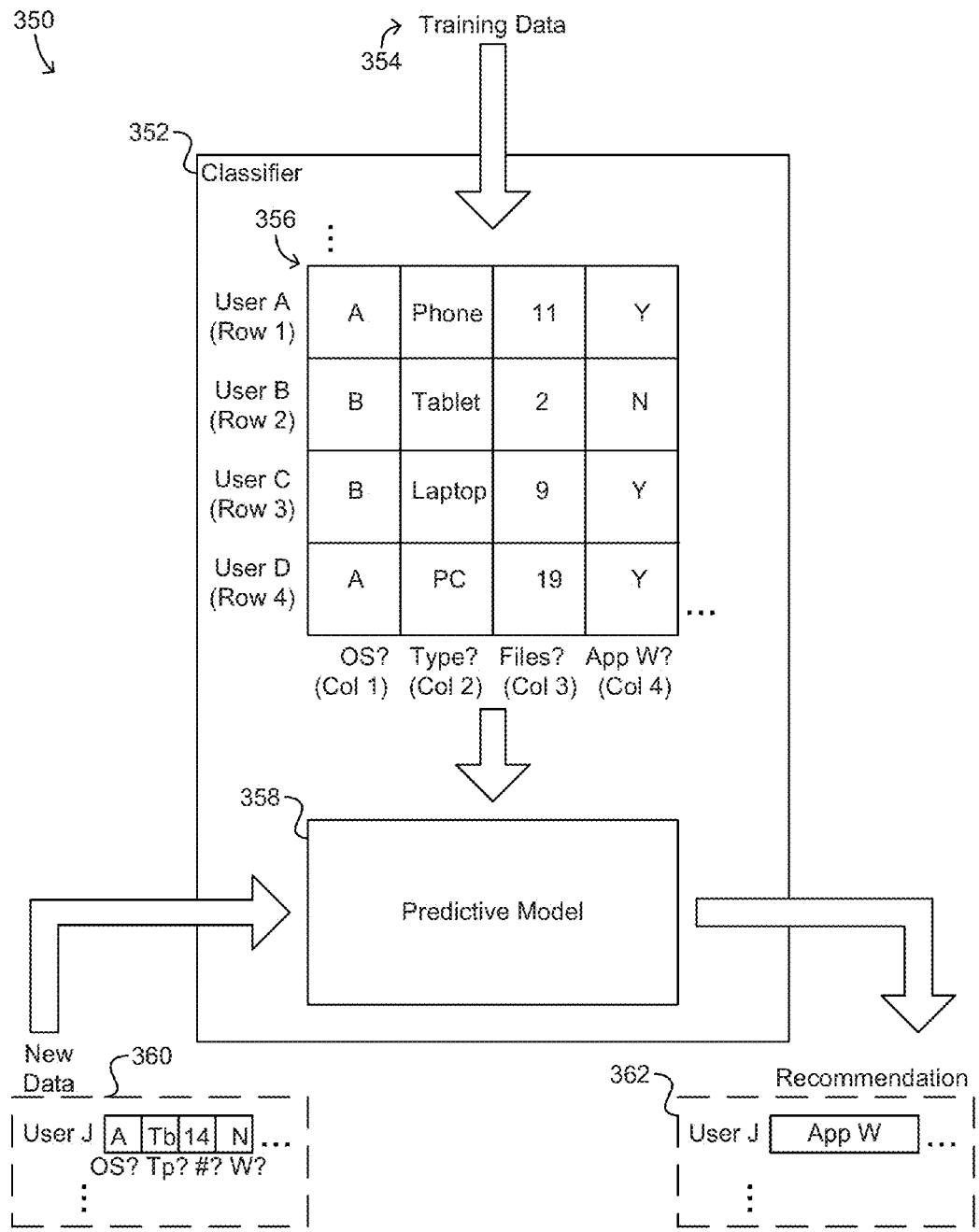
FIG. 3B shows an exemplary system embodiment for recommending applications compatible with a content management system.

In some embodiments, training data need not be represented as binary values in the matrix or other data structure. With reference now to FIG. 3B, there can be an exemplary system embodiment for recommending applications compatible with a content management system. In FIG. 3B, exemplary system embodiment 350 can comprise classifier module 352. Classifier module 352 can obtain or receive training data 354 and generate matrix 356 based on training data 354.

As shown in the example of FIG. 3B, matrix 356 can include a plurality of attributes related to usage of the content management system by a plurality of users. In some embodiments, the cells of matrix 356 can, but need not, hold binary values. For example, Column 1 can correspond to the operating systems of the users' devices used with the content management system. Column 2 can correspond to device types for the users' devices (e.g., phone, tablet, laptop, PC, etc.). Column 3 can correspond to the number of files each user has under his account with the content management system. Column 4 can correspond to whether or not each user is associated with (e.g., has installed) App W.

As shown in the example of FIG. 3B, User A is using the content management system with a phone that runs Operating System A (OS A), has 11 files stored under his account with the content management system, and has installed App W compatible with the content management system. Moreover, User B is using the content management system with a tablet that runs Operating System B (OS B), has 2 files stored under his account with the content management system, and has not installed App W for the content management system. User C is using a laptop that runs OS B, has 9 files stored under his content management system account, and has installed App W. User D is using a PC with OS A, has 19 files under his account, and has installed App W.

Continuing with the example, predictive model 358 can analyze the attributes and identify correlations between the attributes, users, and/or applications. In this example, predictive model 358 can observe a correlation between users with OS A devices having more than 10 files on their content management system accounts and App W. In other words, predictive model 358 can predict that users with devices running OS A and having more than 10 files tend to have App W installed. As such, predictive model 358 can be used to analyze new data 360 and observe that User J uses the content management system with an OS A tablet, has 14 files on his account with the content management system, but does not have App W installed. As such, system 350 can recommend 362 App W to User J.

Figure 4:
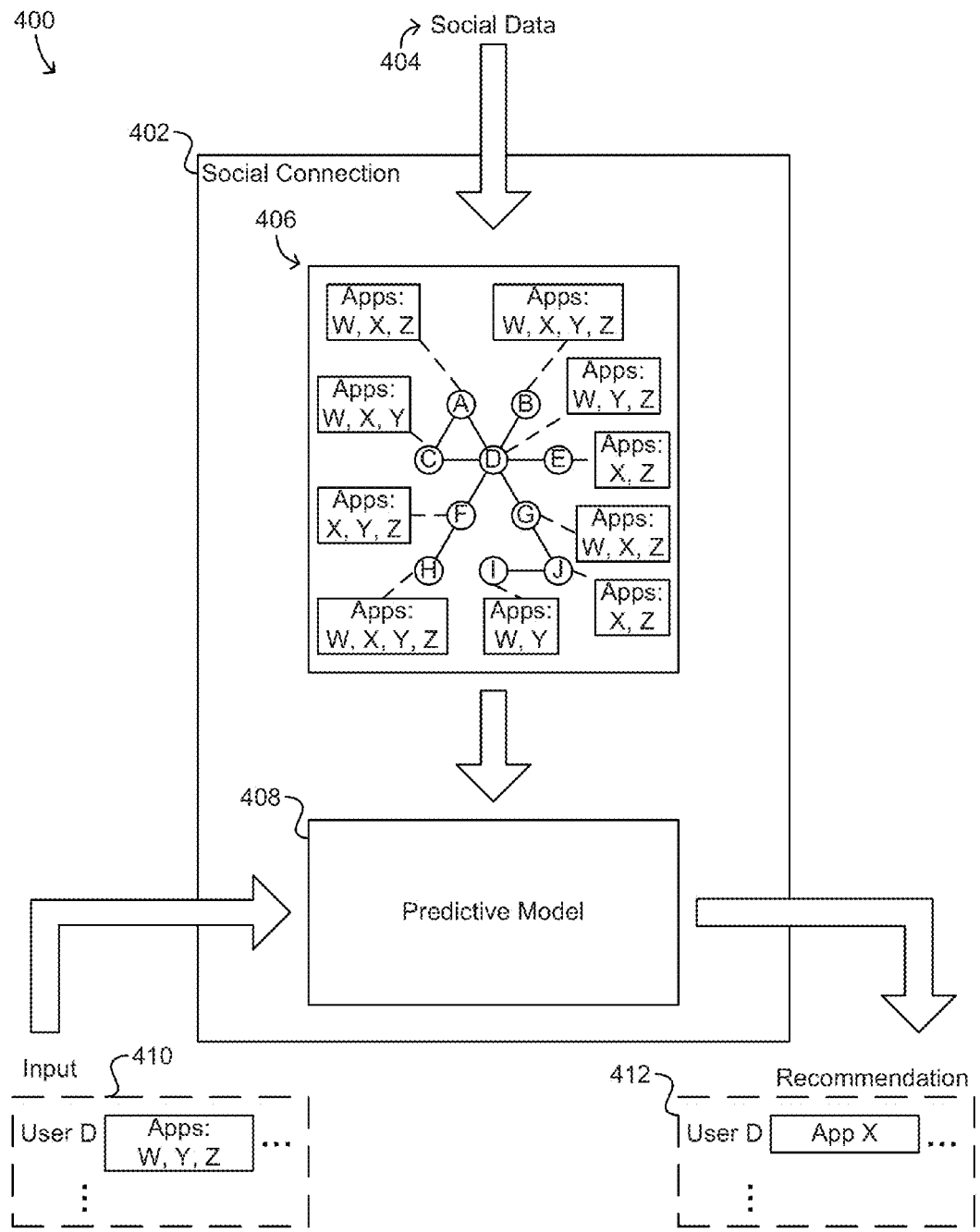
FIG. 4 shows an exemplary system embodiment for recommending applications compatible with a content management system.

Referring now to FIG. 4, exemplary system embodiment 400 for recommending applications compatible with a content management system is shown. Exemplary system embodiment 400 can include social connection module 402 configured to obtain or receive social data 404. Social data 404 can include, at least in part, information about social connections associated with a plurality of users of the content management system. Two users can be socially connected with respect to the content management system if at least one of them has shared some data with the other via the content management system.

In one example, the information about the social connections can include information about the plurality of users of the content management system, information about a plurality of applications for the content management system installed by each user, and information about contents (i.e., content items) that are shared among the users via the content management system. The information about the social connections can be organized, stored, and/or represented in a graph (e.g., a "social" graph) 406. It is contemplated that other appropriate data structures can be used as well.

Continuing with the example, predictive model 408 can be generated based on graph 406. In some cases, machine learning can be utilized to facilitate in the generating of predictive model 408. Predictive model 408 can analyze the information about the social connections and/or graph 406 to identify correlations among a user, other users with whom he has shared one or more contents (e.g., files, folders, data, etc.), and applications associated with (e.g., installed by, used by, accessed by, etc.) the users. In this example, predictive model 408 can recognize 410 that User D has installed Apps W, Y, and Z. Predictive model 408 can also recognize that all other users (e.g., Users A, B, C, E, F, and G) with whom User D has directly shared at least some data have installed App X. As such, system 400 can recommend 412 App X to User D.

In some embodiments, different social connections can be weighted differently. For example, if a first user shares a large amount of data with a second user but only shares a small amount of data with a third user, then the social connection between the first and second users can be weighted more significantly than the social connection between the first and third users. As such, for example, more applications of the second user, as compared to applications of the third user, can be recommended to the first user. Moreover, in some embodiments, second degree social connections can be taken into account when making application recommendations.

Figure 5:
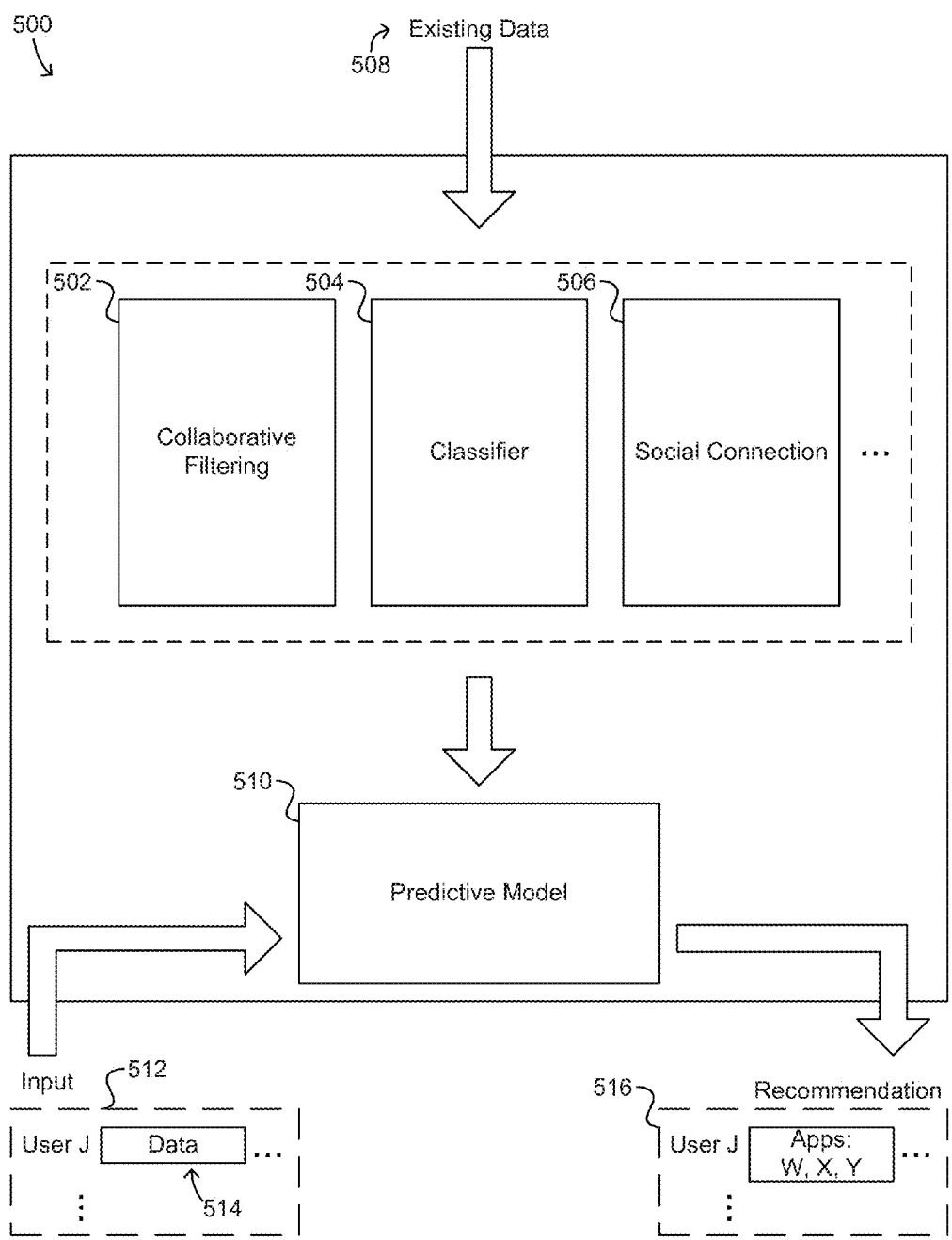
FIG. 5 shows an exemplary system embodiment for recommending applications compatible with a content management system.

In some embodiments, the collaborative filtering, classifier, and social connection approaches can be utilized independently or in conjunction to determine application recommendations. FIG. 5 shows an exemplary system embodiment for recommending applications compatible with a content management system. In FIG. 5, exemplary system embodiment 500 can include collaborative filtering module 502, classifier module 504, and social connection module 506. System 500 can obtain or receive existing data 508. Collaborative filtering module 502, classifier module 504, and social connection module 506 can analyze existing data 508. System 500 can generate collective predictive model 510 based on the analysis of existing data 508. In some case, machine learning can facilitate in the generating of predictive model 510. In some embodiments, aspects of the various modules (e.g., collaborative filtering module 502, classifier module 504, and social connection module 506, etc.) can be combined to generate predictive model 510 (e.g., a collective predictive model). In some embodiments, each module can independently generate its own respective predictive model, and predictive model 510 can be based on the predictive models generated independently by the modules.

As shown in the example of FIG. 5, system 500 can receive input 512 including information 514 about User J. Based on analyzing the information 514 about User J using predictive model 510, system 500 can make a recommendation 516 for applications (e.g., W, X, and Y) to User J.

Figure 6:
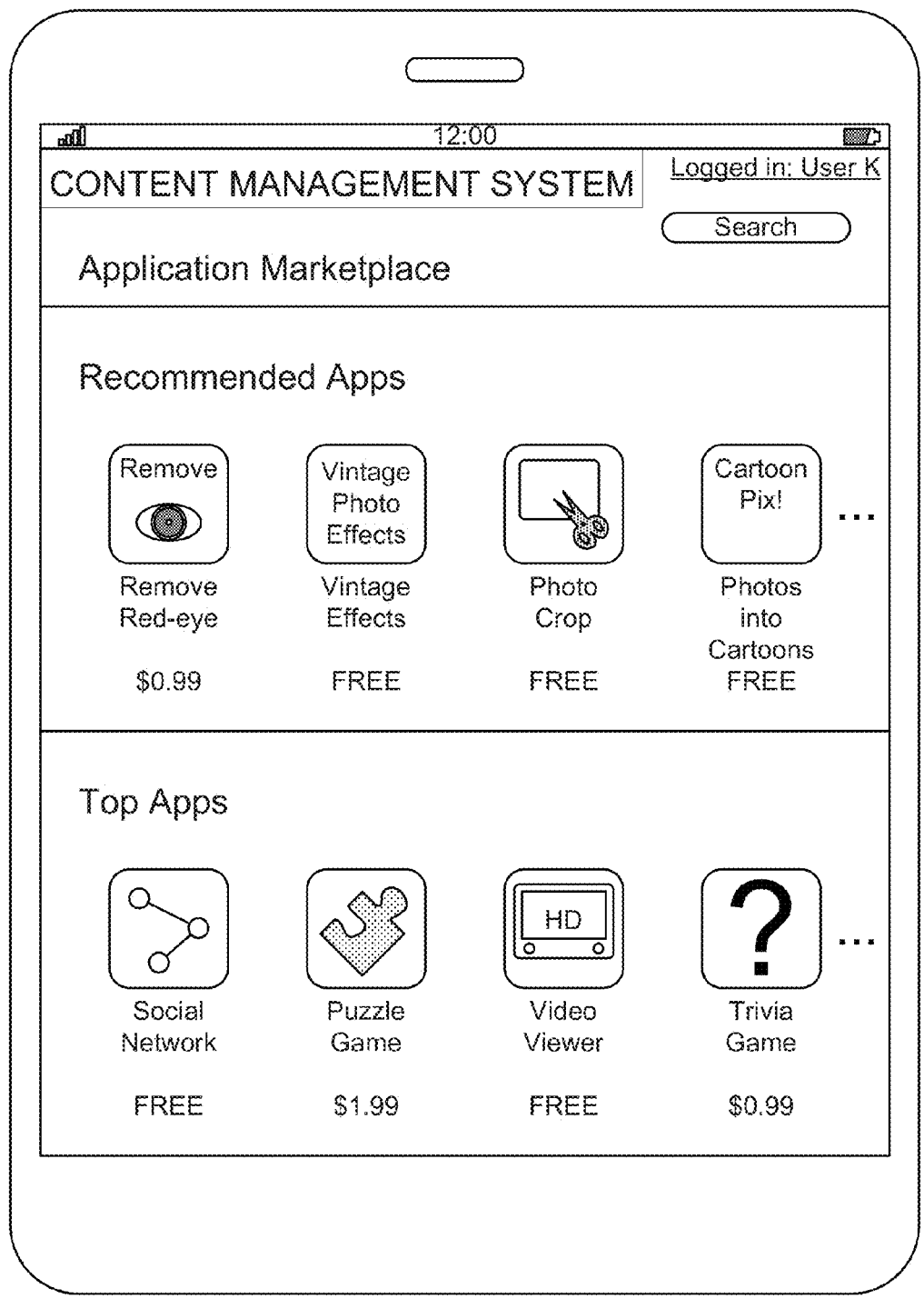
FIG. 6 shows an exemplary approach for providing access to recommended applications compatible with a content management system.

FIG. 6 shows an exemplary approach for providing access to recommended applications compatible with a content management system. In some embodiments, a particular user can access the content management system via a user interface (UI). In some instances, the UI can provide an electronic marketplace, such as an application marketplace, which can provide the particular user with access to one or more applications recommended for the particular user.

Figure 7:
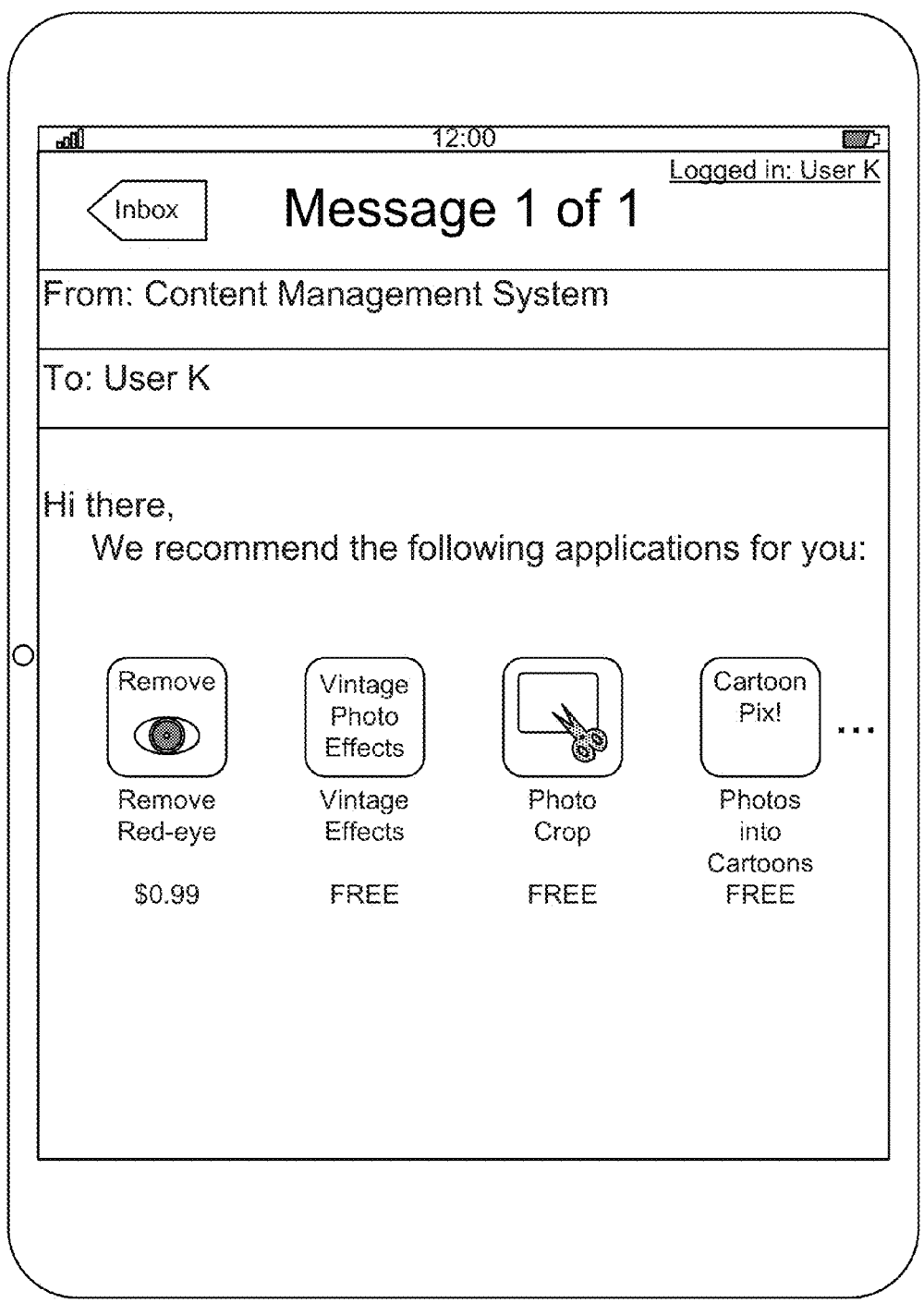
FIG. 7 shows an exemplary approach for providing access to recommended applications compatible with a content management system.

FIG. 7 shows an exemplary approach for providing access to recommended applications compatible with a content management system. In some embodiments, the content management system can determine application recommendations for a particular user and provide the particular user with access to recommended applications via a communication. For example, as shown in FIG. 7, the content management system can transmit a communications email or SMS text message to the particular user to provide access to the recommended applications.

Figure 8:
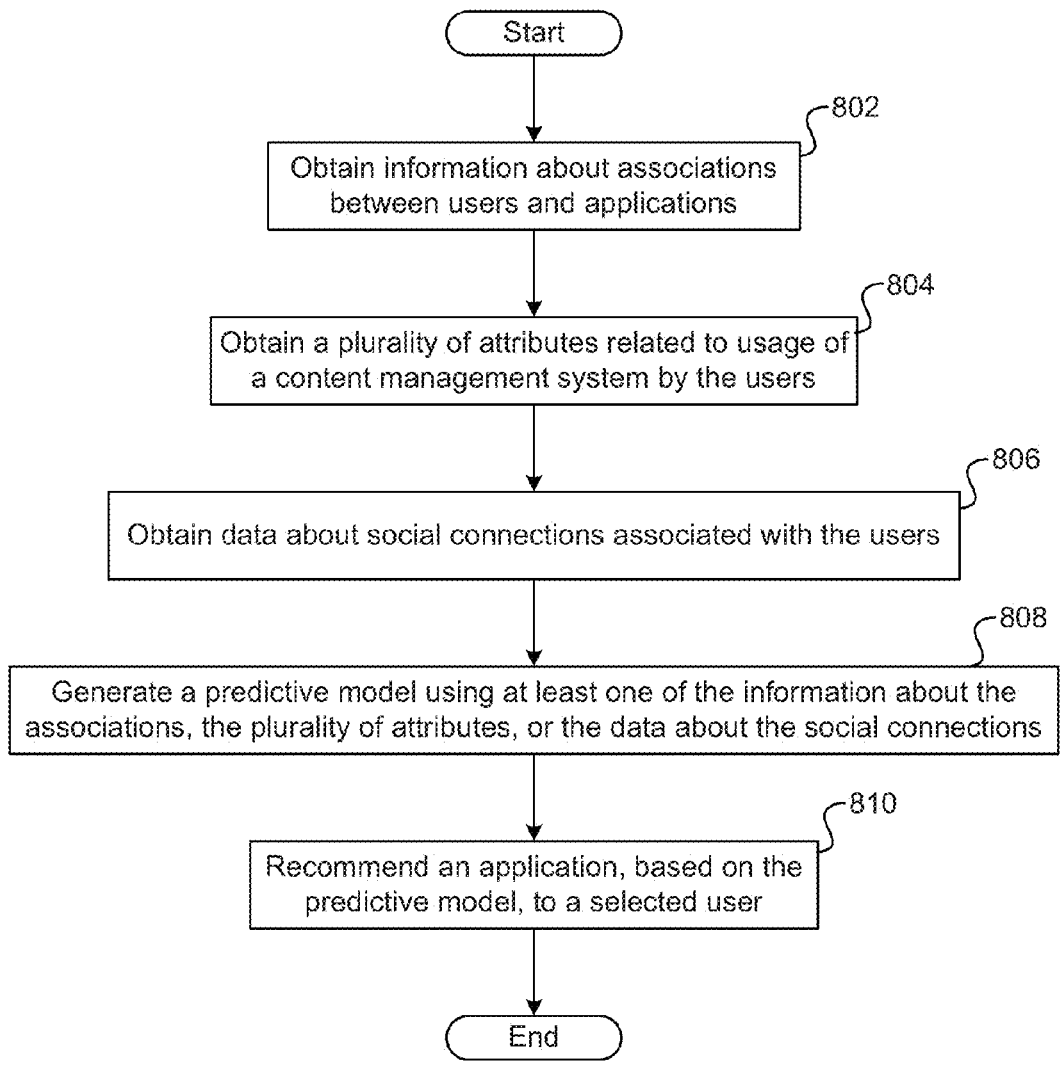
FIG. 8 shows an exemplary method embodiment for recommending applications compatible with a content management system.

FIG. 8 shows an exemplary method embodiment for recommending applications compatible with a content management system. It should be understood that there can be additional, fewer, or alternative steps performed in similar or alternative orders, or in parallel, within the scope of the various embodiments unless otherwise stated. The exemplary method embodiment can begin with obtaining information about associations between a plurality of users of a content management system and a plurality of applications compatible with the content management system, at step 802. In some embodiments, the information can indicate a level of engagement for each user in the plurality of users with respect to each application in the plurality of applications. For example, the level of engagement can indicate whether or not a user has installed an application and/or how often (if at all) the user interacts with (e.g., uses, accesses, etc.) the application.

Step 804 can include obtaining a plurality of attributes associated with each user in the plurality of users. The plurality of attributes can provide information related to usage of the content management system by each user in the plurality of users. At step 806, the exemplary method embodiment can obtain data about social connections associated with the plurality of users. In some embodiments, the data about the social connections can indicate contents (i.e., content items) shared among the plurality of users using the content management system.

Step 808 can include generating a predictive model using at least one of the information about the associations, the plurality of attributes, or the data about the social connections. The method embodiment can then recommend one or more applications compatible with the content management system to a selected user outside the plurality of users, at step 810. The recommending can be based, at least in part, on the predictive model.

Figure 9:
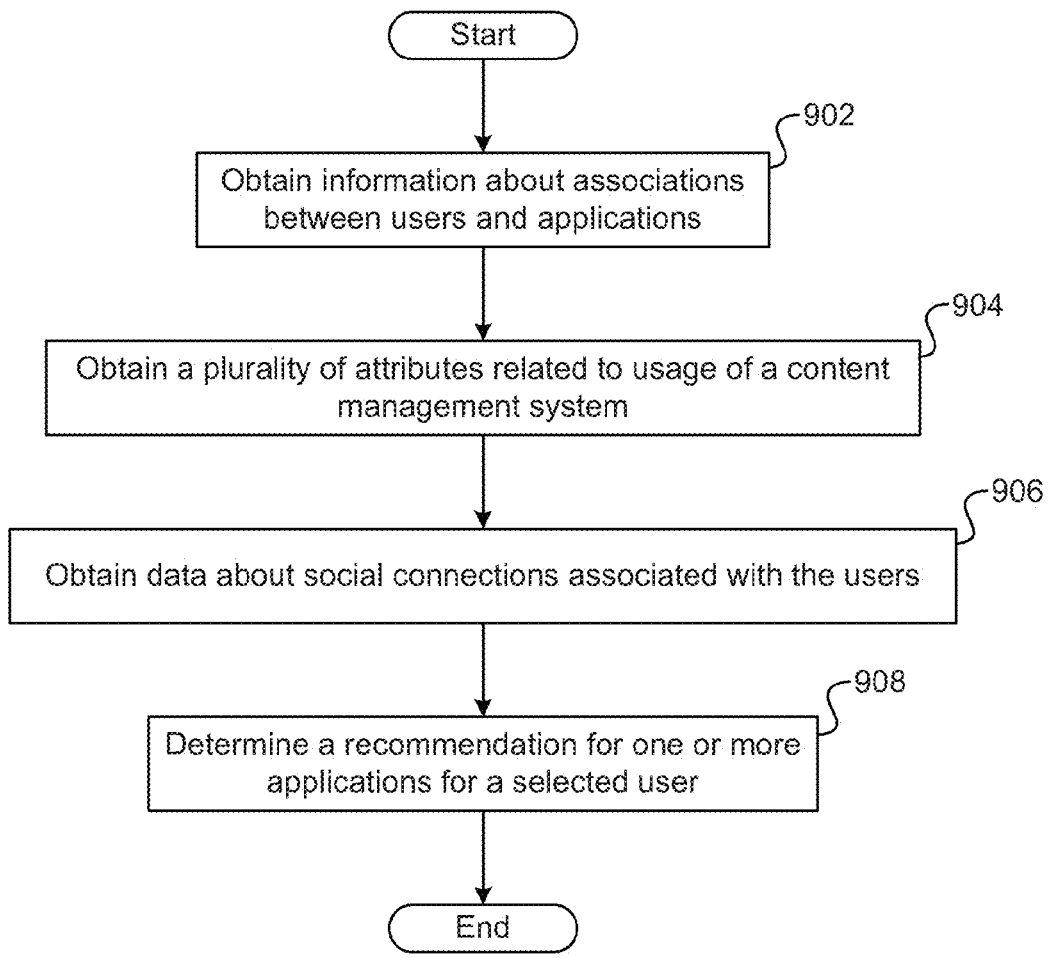
FIG. 9 shows an exemplary method embodiment for recommending applications compatible with a content management system.

FIG. 9 shows an exemplary method embodiment for recommending applications compatible with a content management system. Again, it should be understood that there can be additional, fewer, or alternative steps performed in similar or alternative orders, or in parallel, within the scope of the various embodiments unless otherwise stated. At step 902, the exemplary method embodiment can obtain information about associations between a plurality of users of a content management system and a plurality of applications for the content management system. At step 904, the method can obtain a plurality of attributes associated with each user in the plurality of users. The plurality of attributes can be related to usage of the content management system by each user in the plurality of users.

Step 906 can include obtaining data about social connections associated with the plurality of users. Step 908 can include determining a recommendation for one or more applications for a selected user based, at least in part, on at least one of the information about the associations, the plurality of attributes, or the data about the social connections.

In some embodiments, the plurality of attributes can be stored in a matrix data structure comprising a plurality of cells, wherein each cell provides a detail associated with a particular user in the plurality of users in relation to a particular attribute in the plurality of attributes. For example, the detail can include (but is not limited to) at least one of a device property (e.g., device type, device identification, device operating system, etc.), a usage pattern (e.g., quantity of contents stored and/or shared, sizes of contents stored and/or shared, etc.), an account property (e.g., free account, premium account, group account, etc.), a content property (e.g., types of contents stored and/or shared, substance of contents stored and/or shared, etc.), a profile property (e.g., user profile information), a preference property (e.g., language, storage size, etc.), or a domain property (e.g., email domain).

Various embodiments can also enable the enhancement or refinement of application recommendation. In some cases, application recommendation can be improved and/or refined over time to make better recommendations (e.g., to recommend more relevant applications). In some embodiments, the one or more models and/or the collective model can be trained in an iterative manner. For example, there can be new and/or additional data (e.g., new training data) that can be used to modify, rebuild, refine, and/or improve the models. In some cases, the data or information related to the selected user can be used to modify, rebuild, refine, and/or improve one or more of the models.

Figure 10A:
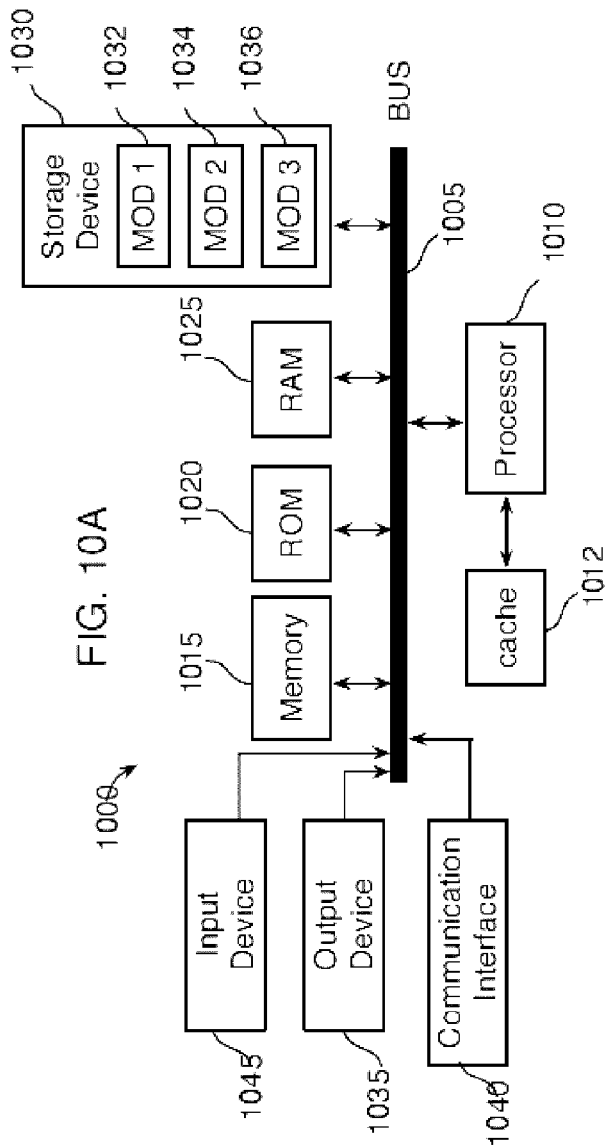
FIG. 10A shows an exemplary possible system embodiment for recommending applications compatible with a content management system.
Figure 10B:
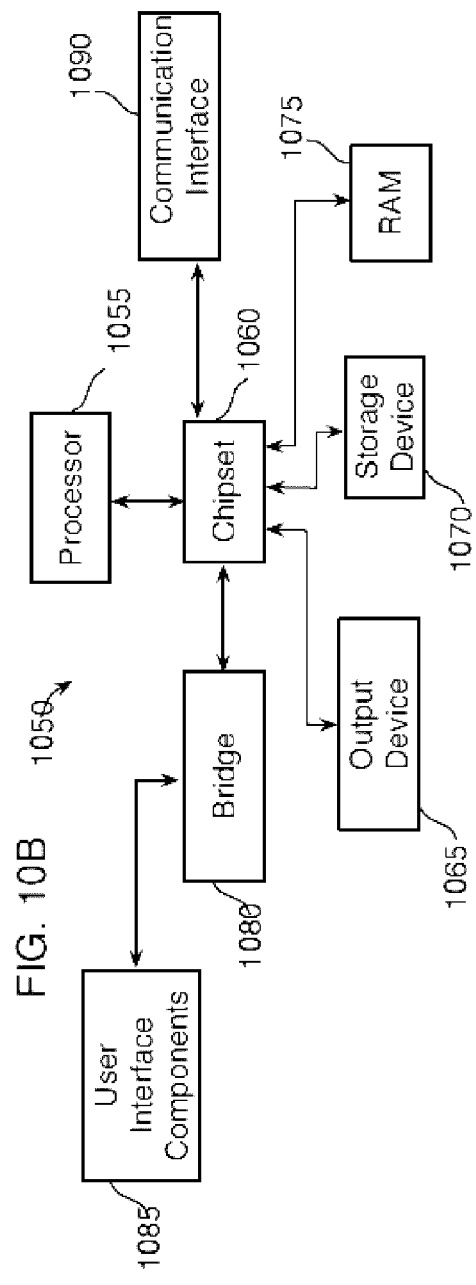
FIG. 10B shows an exemplary possible system embodiment for recommending applications compatible with a content management system.

With reference now to FIG. 10A and FIG. 10B, FIG. 10A and FIG. 10B show exemplary possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for application recommendation comprising:
   obtaining information about associations between a plurality of user accounts of a synchronized content management system and a plurality of applications compatible with the synchronized content management system, the information indicating a level of engagement at each user account in the plurality of user accounts with respect to each application in the plurality of applications;
   obtaining a plurality of attributes associated with each user account in the plurality of user accounts, the plurality of attributes providing information related to usage of the synchronized content management system at each user account;
   obtaining data about social connections associated with the plurality of user accounts, the data about the social connections indicating content items shared among the plurality of user accounts using at least one synchronized shared folder via the synchronized content management system, wherein changes to the content items within the at least one synchronized shared folder are automatically synchronized;
   generating a predictive model using at least one of the information about the associations, the plurality of attributes, or the data about the social connections; and
   recommending one or more applications compatible with the synchronized content management system to a selected user account outside the plurality of user accounts, the recommending being based, at least in part, on the predictive model.

2. The computer-implemented method of claim 1, wherein the information related to the usage of the synchronized content management system at each user account comprises at least one of information about a device used with each user account to interact with the synchronized content management system, information about content items associated with each user account and stored at the synchronized content management system, information about each user account of the synchronized content management system, user profile information associated with each user account, or preference information associated with each user account.

3. The computer-implemented method of claim 2, wherein the information about the device indicates at least one of a type of the device, an operating system running on the device, or an identification for the device.

4. The computer-implemented method of claim 2, wherein the information about the content items associated with each user account and stored at the synchronized content management system indicates at least one of a quantity of content items associated with each user account and stored at the synchronized content management system, a quantity of content items shared by each user account using the synchronized content management system, content types for the content items associated with each user account, content types for the content items shared by each user account, content sizes for the content items associated with each user account, or content sizes for the content items shared by each user account.

5. The computer-implemented method of claim 1, wherein the information about the associations is represented using a matrix data structure comprising a plurality of cells, each cell specifying the level of engagement for a particular user account in the plurality of user accounts with respect to a particular application in the plurality of applications.

6. The computer-implemented method of claim 1, wherein the information related to the usage of the synchronized content management system at each user account is represented using a matrix data structure comprising a plurality of cells, each cell providing a detail associated with a particular user account in the plurality of user accounts in relation to a particular attribute in the plurality of attributes.

7. The computer-implemented method of claim 6, wherein the detail includes at least one of a device property, a usage pattern, an account property, a content item property, a profile property, a preference property, or a domain property.

8. The computer-implemented method of claim 1, wherein the data about the social connections is represented using a graph data structure comprising a plurality of nodes corresponding to the plurality of user accounts, wherein a first node in the plurality of nodes corresponds to a first user account in the plurality of user accounts, wherein a second node in the plurality of nodes corresponds to a second user account in the plurality of user accounts, and wherein the first node and the second node are connected by an edge when the first user account and the second user account have shared content.

9. A system comprising:
a processor;
a computer readable medium; and
computer readable instructions, stored on the computer readable medium, that when executed by the processor are effective to cause the system to:
obtain information about associations between a plurality of user accounts of a synchronized content management system and a plurality of applications for the synchronized content management system;
obtain a plurality of attributes associated with each user account in the plurality of user accounts, the plurality of attributes being related to usage of the synchronized content management system at each user account;
obtain data about social connections associated with the plurality of user accounts, the data about social connections indicating content items shared among the plurality of user accounts using at least one synchronized shared folder via the synchronized content management system, wherein changes to the content items within the at least one synchronized shared folder are automatically synchronized; and
determine a recommendation for one or more applications for a selected user account based, at least in part, on at least one of the information about the associations, the plurality of attributes, or the data about the social connections.

10. The system of claim 9, wherein the computer readable instructions cause the system to further produce a classification model configured to identify correlations between the plurality of user accounts and the plurality of applications, wherein the classification model is produced based, at least in part, on at least one of the information about the associations, the plurality of attributes, or the data about the social connections, and wherein the determining of the recommendation for the one or more applications for the selected user account is based, at least in part, on the classification model.

11. The system of claim 9, wherein the computer readable instructions cause the system to further provide the selected user account with access to the one or more applications, the access being provided via at least one of an electronic marketplace or a communication directed to the selected user account.

12. The system of claim 9, wherein the plurality of attributes comprises at least one of information about a device used with each user account to interact with the synchronized content management system, information about content items associated with each user account and stored at the synchronized content management system, information about each user account of the synchronized content management system, user profile information associated with each user account, or preference information associated with each user account.

13. The system of claim 12, wherein the information about the device indicates at least one of a type of the device, an operating system running on the device, or an identification for the device.

14. The system of claim 12, wherein the information about the content items associated with each user account and stored at the synchronized content management system indicates at least one of a quantity of content items associated with each user account and stored at the synchronized content management system, a quantity of content items shared by each user account using the synchronized content management system, content types for the content items associated with each user account, content types for the content items shared by each user account, content sizes for the content items associated with each user account, or content sizes for the content items shared by each user account.

15. A non-transitory computer-readable medium storing computer executable instructions for causing a computer to perform a method comprising:
obtaining information about associations between a plurality of user accounts of a synchronized content management system and a plurality of applications for the synchronized content management system;
obtaining a plurality of attributes associated with each user account in the plurality of user accounts, the plurality of attributes being related to usage of the synchronized content management system at each user account;
obtaining data about social connections associated with the plurality of user accounts, the data about social connections indicating content items shared among the plurality of user accounts using at least one synchronized shared folder via the synchronized content management system, wherein changes to the content items within the at least one synchronized shared folder are automatically synchronized; and
determining a recommendation for one or more applications for a selected user account based, at least in part, on at least one of the information about the associations, the plurality of attributes, or the data about the social connections.

16. The non-transitory computer-readable medium of claim 15, wherein the method further comprises: producing a classification model configured to identify correlations between the plurality of user accounts and the plurality of applications, wherein the classification model is produced based, at least in part, on at least one of the information about the associations, the plurality of attributes, or the data about the social connections, and wherein the determining of the recommendation for the one or more applications for the selected user account is based, at least in part, on the classification model.

17. The non-transitory computer-readable medium of claim 15, wherein the information about the associations is represented using a matrix data structure comprising a plurality of cells, each cell specifying a level of interactivity for a particular user account in the plurality of user accounts with respect to a particular application in the plurality of applications.

18. The non-transitory computer-readable medium of claim 15, wherein the plurality of attributes is stored in a matrix data structure comprising a plurality of cells, each cell providing a detail associated with a particular user account in the plurality of user accounts in relation to a particular attribute in the plurality of attributes.

19. The non-transitory computer-readable medium of claim 18, wherein the detail includes at least one of a device property, a usage pattern, an account property, a content item property, a profile property, a preference property, or a domain property.

20. The non-transitory computer-readable medium of claim 15, wherein the data about the social connections is represented using a graph data structure comprising a plurality of nodes corresponding to the plurality of user accounts, wherein a first node in the plurality of nodes corresponds to a first user account in the plurality of user accounts, wherein a second node in the plurality of nodes corresponds to a second user account in the plurality of user accounts, and wherein the first node and the second node are connected by an edge when the first user account and the second user account have shared content.

* * * * *